(12) United States Patent  (10) Patent No.: US 7,455,416 B2
Chen  (45) Date of Patent: Nov. 25, 2008

(54) LIGHT GUIDE STRUCTURE AND KEYPAD HAVING THE SAME

(75) Inventor: Ko-Ju Chen, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 108 days.

(21) Appl. No.: 11/560,957

(22) Filed: Nov. 17, 2006

(65) Prior Publication Data

US 2008/0117618 A1  May 22, 2008

(51) Int. Cl.
    *F21V 33/00* (2006.01)
(52) U.S. Cl. .............................. 362/85; 200/314; 362/30
(58) Field of Classification Search ................. 362/85, 362/24, 29, 30, 86, 227, 236, 240, 244, 326, 362/327, 330, 337, 612, 616, 620; 200/5 A, 200/512, 513, 310, 313, 314
    See application file for complete search history.

(56) References Cited

U.S. PATENT DOCUMENTS

| 5,053,928 | A |   | 10/1991 | Pasco |   |
|---|---|---|---|---|---|
| 5,083,240 | A |   | 1/1992 | Pasco |   |
| 5,746,493 | A |   | 5/1998 | Jonsson et al. |   |
| 5,847,336 | A | * | 12/1998 | Thornton | 200/5 A |
| 5,960,942 | A | * | 10/1999 | Thornton | 200/314 |
| 6,422,712 | B1 |   | 7/2002 | Nousiainen et al. |   |
| 6,592,233 | B1 |   | 7/2003 | Parikka |   |
| 6,676,268 | B2 |   | 1/2004 | Ohkawa |   |
| 6,746,129 | B2 |   | 6/2004 | Ohkawa |   |
| 6,805,490 | B2 |   | 10/2004 | Levola |   |
| 6,834,973 | B2 |   | 12/2004 | Ohkawa |   |
| 6,836,303 | B2 |   | 12/2004 | Kim |   |
| 6,926,418 | B2 | * | 8/2005 | Ostergård et al. | 362/24 |
| 6,979,112 | B2 | * | 12/2005 | Yu et al. | 362/600 |
| 6,991,359 | B2 |   | 1/2006 | Leu et al. |   |
| 7,068,332 | B2 | * | 6/2006 | Liu et al. | 349/64 |
| 7,097,341 | B2 | * | 8/2006 | Tsai | 362/625 |
| 2006/0044830 | A1 | * | 3/2006 | Inoue et al. | 362/614 |
| 2006/0139952 | A1 | * | 6/2006 | Inoue et al. | 362/613 |
| 2006/0256581 | A1 | * | 11/2006 | Hwang et al. | 362/619 |
| 2007/0068783 | A1 | * | 3/2007 | Kim et al. | 200/310 |
| 2007/0070043 | A1 | * | 3/2007 | Kim | 345/168 |
| 2007/0159848 | A1 | * | 7/2007 | Yang et al. | 362/608 |

* cited by examiner

*Primary Examiner*—Hargobind S Sawhney

(57) ABSTRACT

A light guide structure installed in a keypad includes a light guide plate and a plurality of light emitting components. The light guide plate has a plurality of light guiding areas, each having a center light guiding circle with a plurality of light guide rings extended outward. The light guiding area and the adjacent light guiding area form light guide rings connected with an intersection, and the center light guiding circle and the light guide rings have a plurality of arc light guiding particles. The light emitting component is installed under the light guide plate and at the corresponding center position of the center light guiding circle. If the light emitting component is lit, light is projected onto the light guide plate and refracted by the light guiding particles to produce a light transmission effect for showing a number or a figure on the surface of the push button.

22 Claims, 9 Drawing Sheets

LIGHT GUIDE STRUCTURE AND KEYPAD HAVING THE SAME

BACKGROUND OF THE INVENTION

1. Field of the Invention

The present invention relates to a light guide structure, and more particularly to a light guide having a light condensing effect.

2. Description of Prior Art

At present, many small electronic devices such as mobile phones, personal digital assistants, global positioning systems are necessary electronic products indispensable to our daily life. These electronic products generally come with a small keypad structure provided for users to input data or execute different functions of the electronic products.

The keypad structure of these electronic devices comes with a backlight source for providing a backlight effect for the keypad where there is insufficient light, and the light of the backlight source can penetrate through the surface of the push button to show a number, a figure or a pattern on the surface of the push button, and thus users will not press the wrong push button while operating the push button on the keypad.

In recent years, many keypad manufacturers try to reduce the overall thickness of the keypad structure, and two light emitting diodes 20 used for the backlight source are installed on both lateral sides of a light guide plate 10 (as shown in FIG. 10). If the light emitting diode 20 is lit, the light is guided along the lateral sides of the light guide plate 10 to evenly illuminate the whole light guide plate 10, and then the light is projected from the light guide plate 10 onto each push button of the keypad. If the light is passed through the surface of the push button, the number or figure on the surface of the push button will be illuminated and displayed for facilitating users to execute their operations.

After light is guided from a lateral side of the light guide plate 10 to another side, the brightness of the light becomes progressively weaker, so that an insufficient light transmission occurs at the surface of the corresponding push button on the other lateral side of the light guide plate 10 and results in an insufficient brightness for displaying the number or figure. To enhance the brightness of the light guide plate 10, a single light emitting diode with a large number of milliamperes (mA) such as 20 mA is used, and the total number of mA of the light emitting diode will be equal to 40 mA, and such arrangement will increase the power consumption and the cost of the electronic device.

SUMMARY OF THE INVENTION

In view of the foregoing shortcomings of the prior art, the inventor of the present invention based on years of experience in the related industry to conduct experiments and modifications, and finally designed a light guide structure in accordance with the present invention to overcome the shortcomings of the prior art structure.

The present invention is to overcome the shortcomings of the prior art and avoid the existing deficiencies by providing a light guide plate having a light condensing effect, so that a light emitting component of a small number of milliamperes (mA) such as four 5 mA light emitting diodes can be installed under the light guide plate to improve the effect of the backlight source and reduce the power consumption and the cost.

The light guide structure of the invention comprises:

a light guide plate, having a plurality of light guiding areas, and each light guiding area has a center light guiding circle, and the external periphery of the center light guiding circle has at least one light guide ring, and each light guiding area and its adjacent light guiding area form at least one light guide ring connected with an intersection, and the center light guiding circle and the light guide ring have a plurality of light guiding particles; and a plurality of light emitting components, installed at a center position corresponding to the center light guiding circle.

A light emitting component is installed under the light guide plate and at a corresponding center position of the center light guiding circle.

If the light emitting component projects light onto the light guide plate, the light will be passed through the light guiding particles and refracted to the corresponding position of the push button, such that the surface of the push button has a light transmission effect to show the number or figure on the push button.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings.

Figure 1:
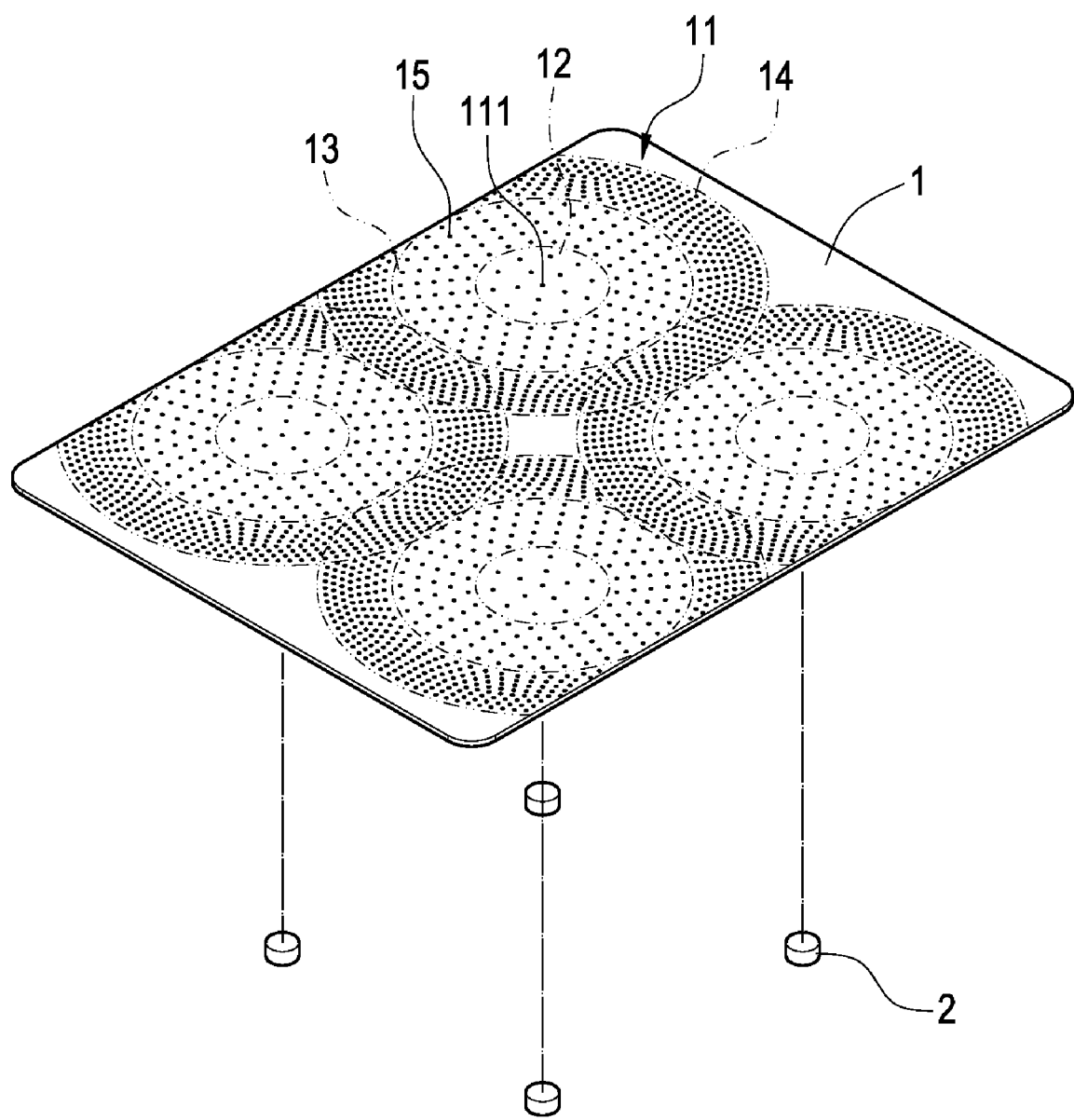
FIG. 1 is a schematic view of a first kind of light guide structure of the present invention.
Figure 2:
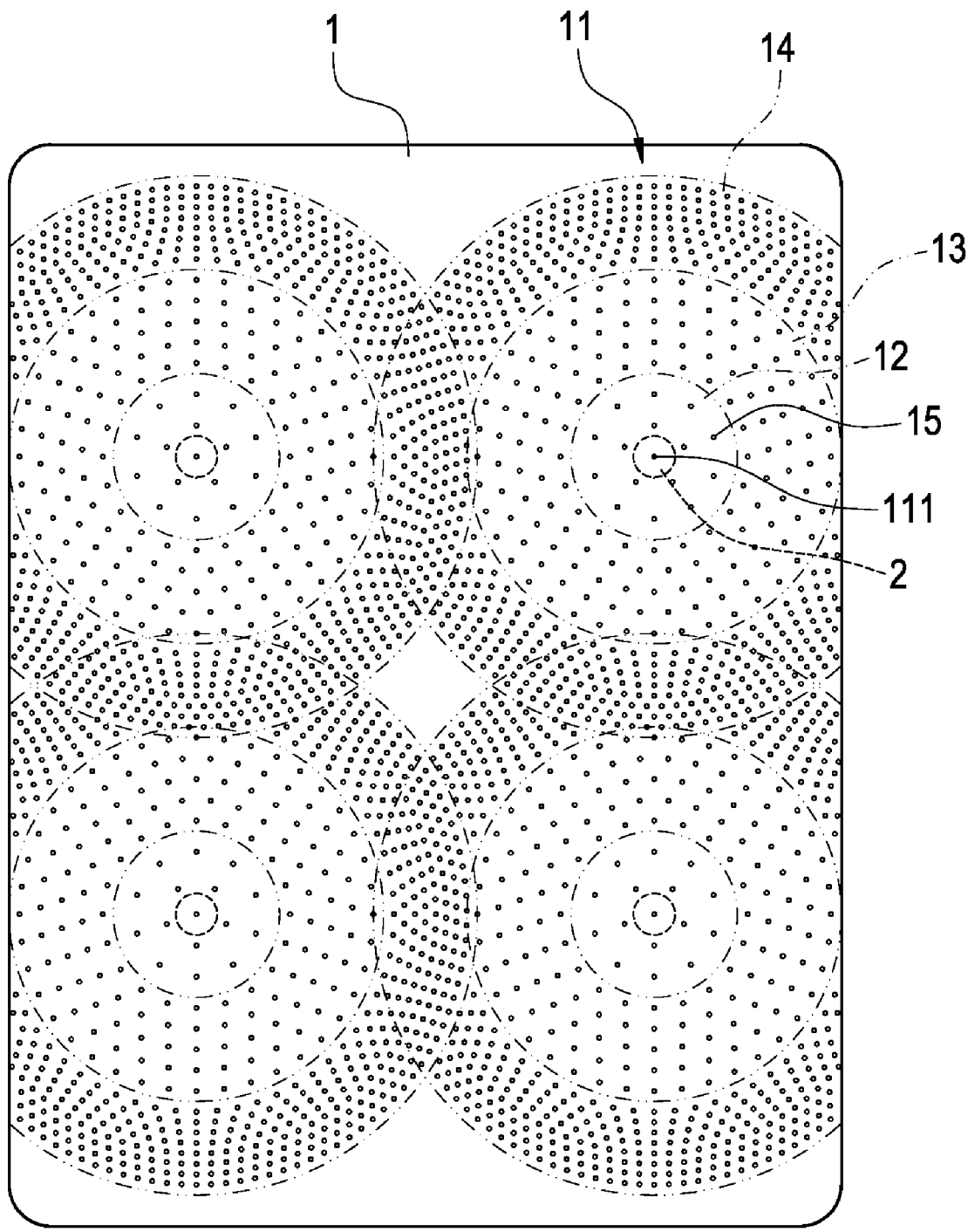
FIG. 2 is a front view of FIG. 1.

Referring to FIGS. 1 and 2 for a schematic view of a first light guide structure of the present invention and a schematic front view of FIG. 1 respectively, the light guide structure comprises; a light guide plate 1 and a plurality of light emitting components 2. The light produced by the light emitting component 2 is projected upwardly and refracted by the plurality of light guiding particles 15 of the light guide plate 1 to a push button (not shown in the figure). In these figures, a plurality of light emitting components refers to four pieces of light emitting components.

The aforementioned light guide plate 1 has a plurality of light guiding areas 11, and each light guiding area 11 has a center light guiding circle 12, and the external periphery of the center light guiding circle 12 has a first light guiding ring 13, and the external periphery of the first light guiding ring 13 has a second light guiding ring 14, and each light guiding area 11 and its adjacent light guiding area 11 form at least one light guide ring connected with an intersection. Each of the center light guiding circle 12, the first light guiding ring 13 and the second light guiding ring 14 has a plurality of arc light guiding particles 15, and the diameter of the light guiding particles 15 falls within a range of 0.01 mm~0.1 mm. Therefore, the distribution density of the center light guiding circle 12 is scatterly distributed (such as 1 dot/mm$^2$), and the distribution density of the first light guiding ring 13 is evenly distributed (such as 10 dots/mm$^2$), and the distribution density of the third light guiding ring 14 is densely distributed (such as 20 dots/mm$^2$). Since light is guided from a lateral side of the light guide plate to another lateral side, the brightness of the light will become weaker progressively, such that the distribution density of the light guiding particles 15 is more scatterly distributed if the distance from the light source is closer, and the distribution density of the light guiding particles 15 is more densely distributed if the distance from the light source is farther.

The light emitting component 2 is installed under the light guide plate 1 and at a corresponding center position 111 of the center light guiding circle 12. If the light emitting component 2 projects light onto the light guide plate 1, the light will be passed through the light guiding particles 15 and refracted to the corresponding position of a push button (not shown in the figure), such that the surface of the push button has a light transmission effect to show a number or a figure on the push button. In the figures, the light emitting component 2 is a light emitting diode.

Figure 3:
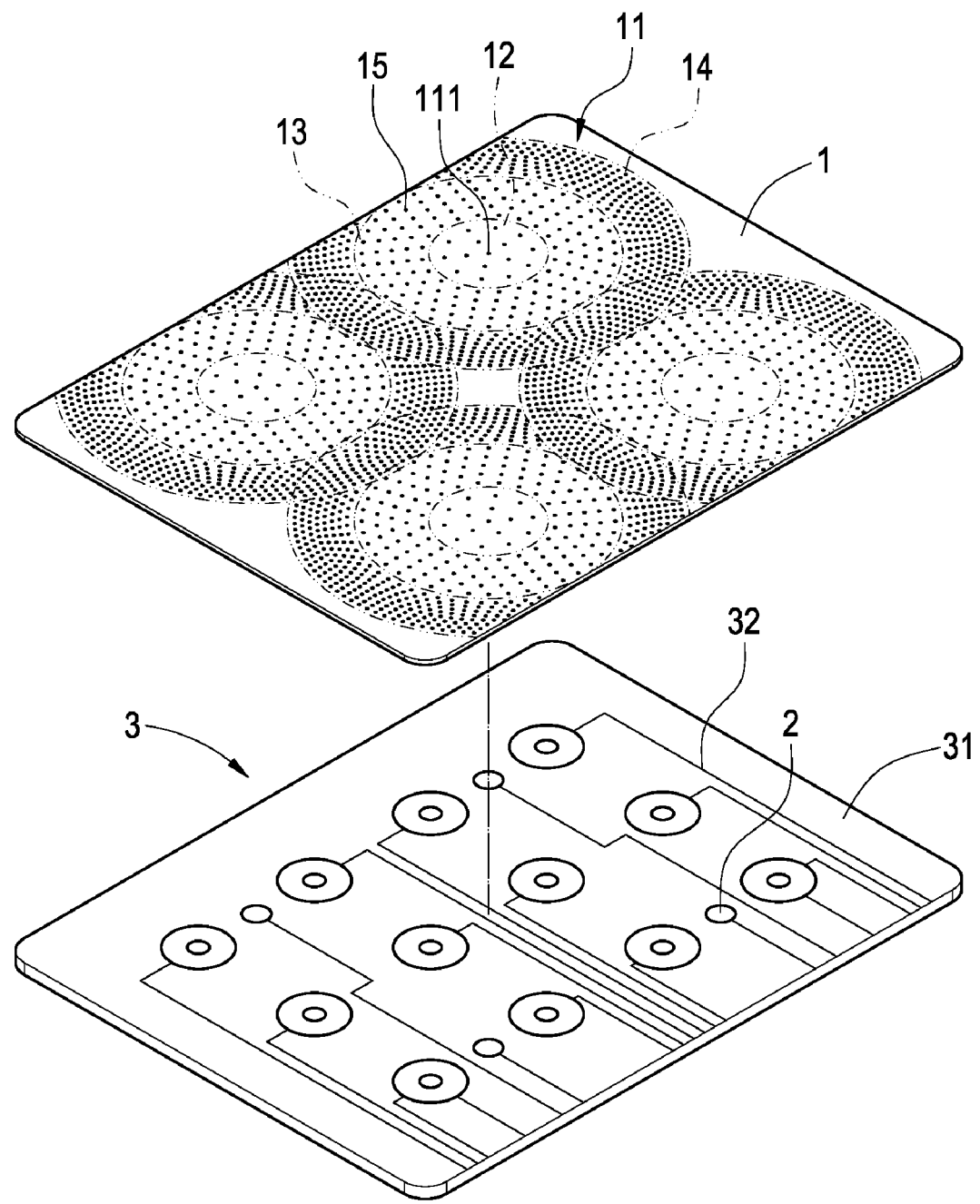
FIG. 3 is a schematic view of a second kind of light guide structure of the present invention.
Figure 4:
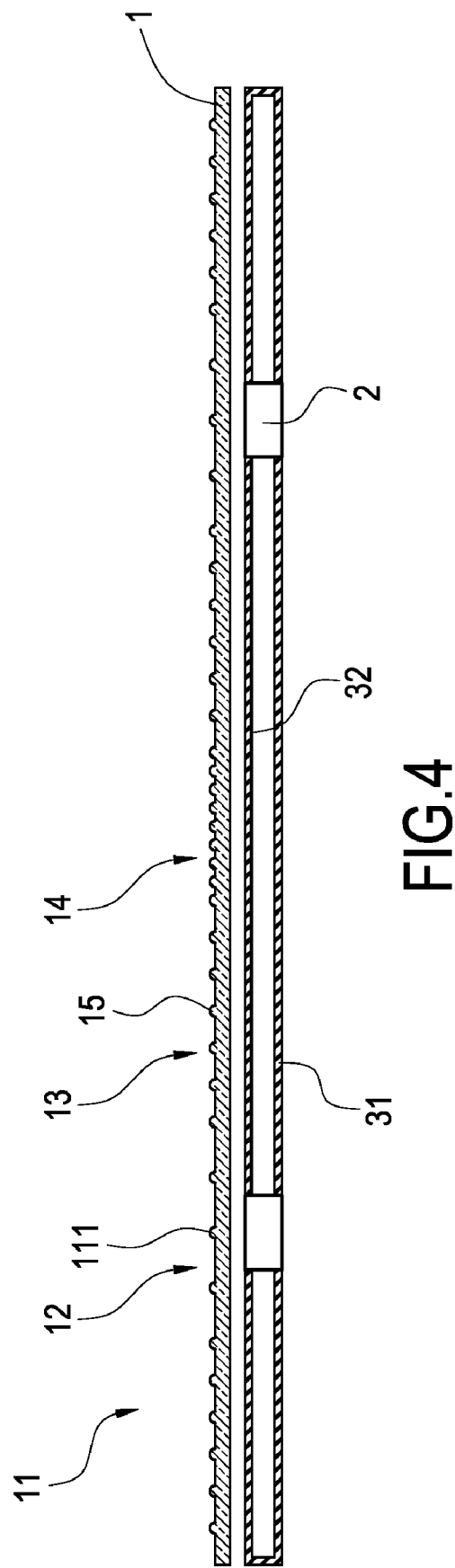
FIG. 4 is a sectional side view of FIG. 3.

Referring to FIGS. 3 and 4 for a schematic view and a sectional view of a second kind of light guide structure of the present invention respectively, the light guide plate 1 is substantially the same as that illustrated in FIG. 1, and the only difference resides on that the plurality of light emitting components 2 are packaged into a thin film circuit board 3. The thin film circuit board 3 is comprised of two soft plastic thin films 31, and the plastic thin films 31 are printed with an electric circuit 32, and an electrically conducting power source of the light emitting component 2 is transmitted by the electric circuit 32 disposed on the plastic thin film 31, or the thin film circuit board 3 can be used for conducting and executing an operating signal when a push button (not shown in the figure) is pressed on the thin film circuit board 3 to execute an operation.

Figure 5:
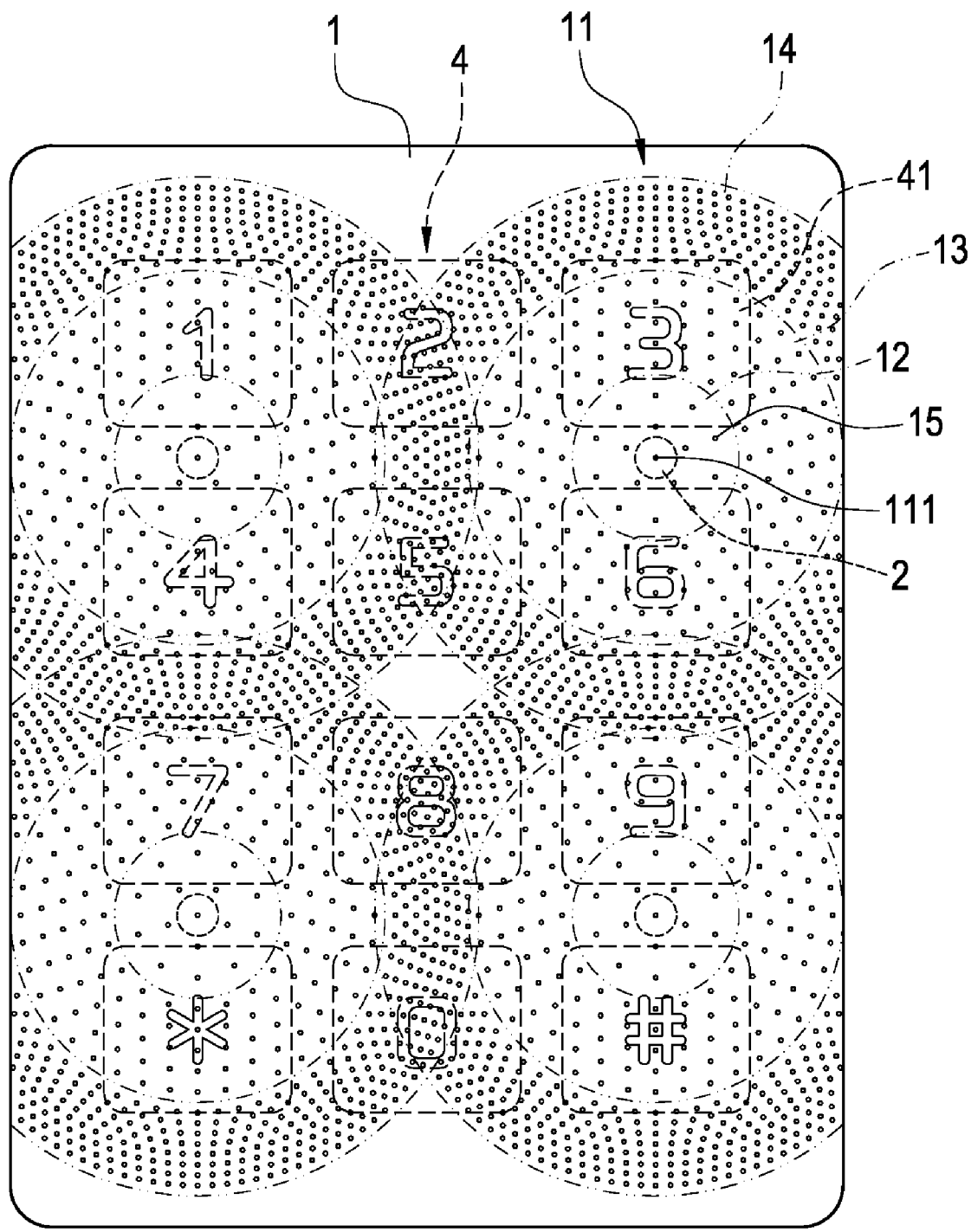
FIG. 5 is a schematic view of a light guide structure corresponding to a push button module in accordance with the present invention.

Referring to FIG. 5 for a schematic view of a light guide structure corresponding to a push button module in accordance with the present invention, each push button 41 corresponds to a light guiding particle 15 with a different distribution density, if the push button module 4 and the light guide plate 1 of the light guide structure are installed with a plurality of light emitting components 2. In this figure, the push button 41 has light guiding particles 15 corresponding to the center light guiding circle 12, first light guiding ring 13 and second light guiding ring 14. When the light emitting component 2 is lit, light is projected onto a light guiding area 11 of the light guide plate 1 and the light is passed through the light guiding particles 15 at the center light guiding circle 12, the first light guiding ring 13 and the second light guiding ring 14 and refracted to the corresponding position of the push button 41, so that the surface of the push button 41 has a light transmission effect to show a number or a figure on the surface of the push button 41.

Figure 6:
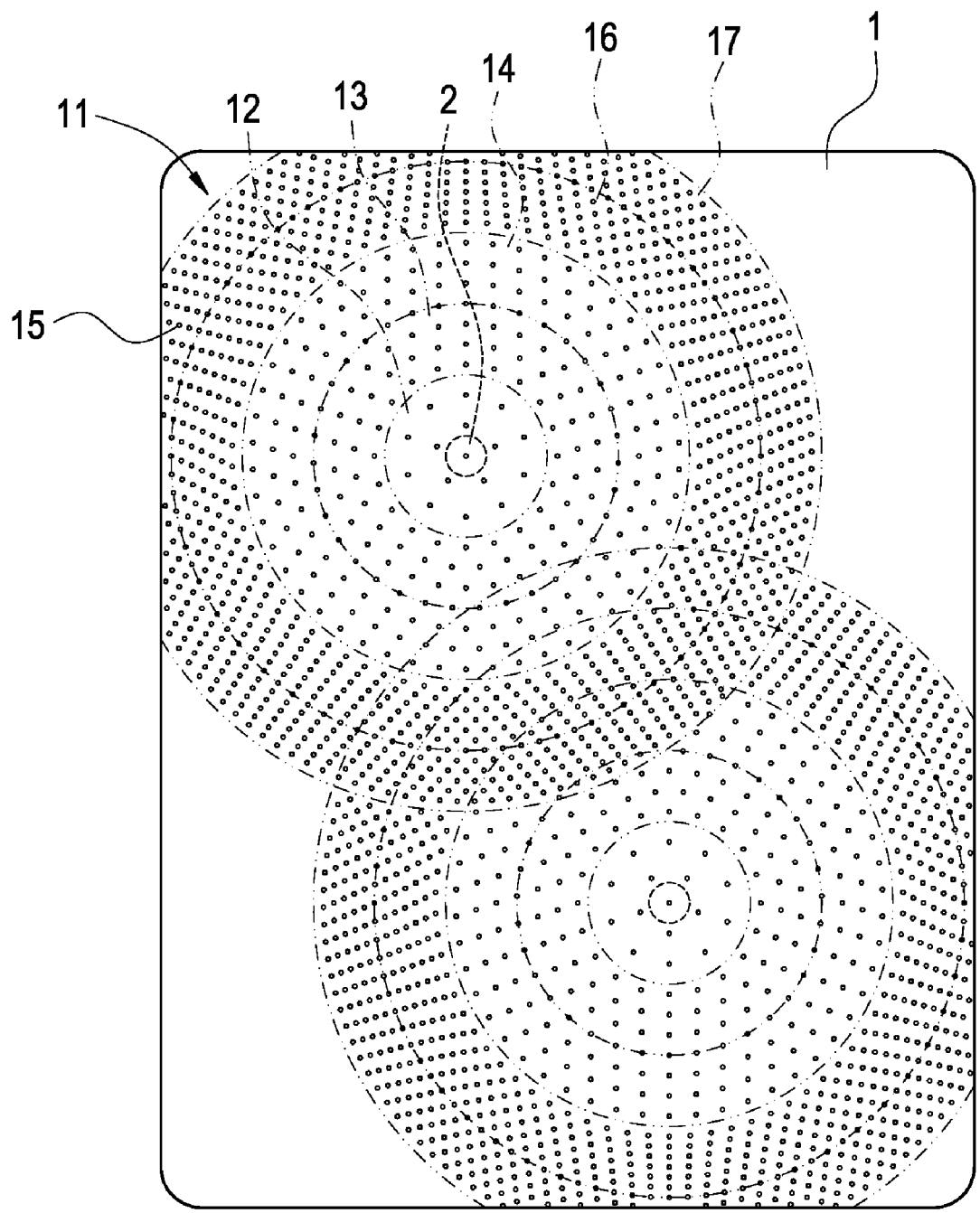
FIG. 6 is a schematic view of a third kind of light guide structure of the present invention.

Referring to FIG. 6 for a schematic view of a third kind of a light guide structure in accordance with the present invention, the light guide structure is comprised of two light emitting components 2, and the two light emitting components 2 are installed diagonally, and thus the light guiding area 11 of the light guide plate 1 is installed diagonally, and the light guiding area 11 has a center light guiding circle 12, and the external periphery of the center light guiding circle 12 has a first light guiding ring 13, and the external periphery of the first light guiding ring 13 has a second light guiding ring 14, and the external periphery of the second light guiding ring 14 has a third light guiding ring 16, and the external periphery of the third light guiding ring 16 has a fourth light guiding ring 17, and the light guiding area 11 and the light guiding area 11 disposed at an diagonally opposite corner form at least one light guide ring connected with an intersection.

The distribution density of light guiding particles 15 at the center light guiding circle 12, first light guiding ring 13, second light guiding ring 14, third light guiding ring 16, and fourth light guiding ring 17 is distributed more scatterly at a distance closer to a light source, and the distribution density is distributed more densely at a distance farther from the light source.

Figure 7:
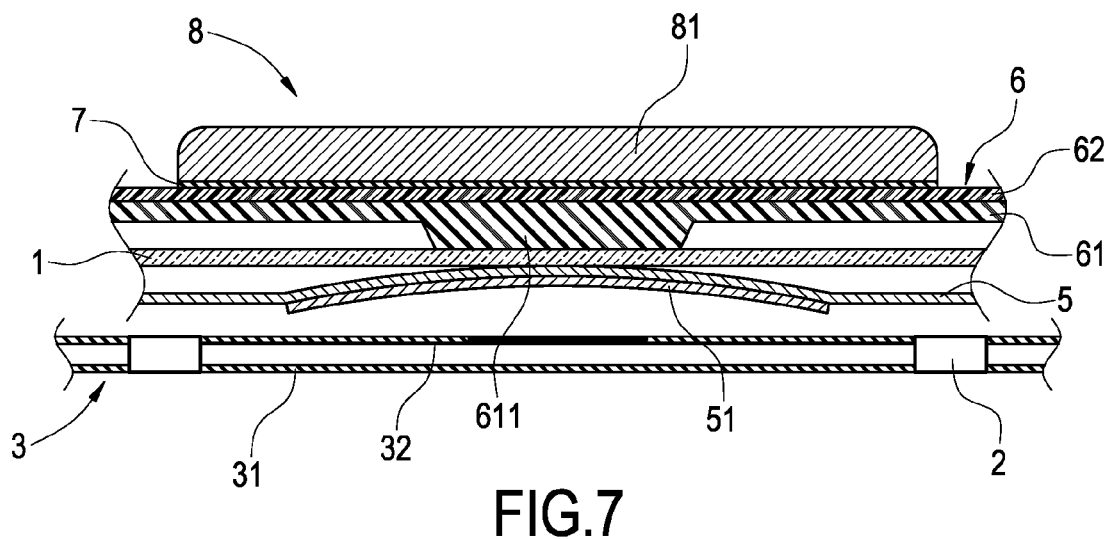
FIG. 7 is a cross-sectional view of a light guide structure derived from the first preferred embodiment of the present invention.

Referring to FIG. 7 for a cross-sectional view of a light guide structure derived from the first preferred embodiment of the present invention, a keypad comprises the following elements:

A thin film circuit board 3 is comprised of two soft plastic thin films 31, and the plastic thin film 31 is printed with an electric circuit 32, and a plurality of light emitting components 2 are installed between the two plastic thin films 31, and the light emitting component 2 is electrically connected to the electric circuit 32, and the electrically conducting power source of the light emitting component 2 is transmitted by the electric circuit 32 of the plastic thin film 31. After the push button is pressed on the thin film circuit board 3 for the operation, the electric circuit 31 outputs an operating signal. In the figure, the corresponding positions of the light emitting component 2 and the light guide plate 1 are the same as those illustrated in FIG. 4 or FIG. 6.

A first elastic layer 5 is made of a transparent plastic material and installed on the thin film circuit board 3, and the first elastic layer 5 has a plurality of metal plates 51. After the push button 81 is pressed, the metal plate 51 produces a snap-in sound, such that users can feel the effect of pressing the push button 81. In the meantime, the metal plate 51 is deformed to press the thin film circuit board 3, and the thin film circuit board 3 outputs an operating signal.

A light guide plate 1 is disposed on the first elastic layer 5, and the structure of the light guide plate 1 is the same as that illustrated in FIG. 4 or FIG. 6, and thus the structure of the light guide plate 1 will not be described further here.

A second elastic layer 6 is disposed on the light guide plate 1 and comprised of a rubber body 61 and a hard plastic thin film 62 disposed on the surface of the rubber body 61, and the bottom of the rubber body 61 has a protruding body 611 corresponding to the metal plate 51.

An adhesive layer 7 is disposed on the second elastic layer 6.

A push button module 8 is disposed on the adhesive layer 7 and comprised of a plurality of push buttons 81, and each push button 81 corresponds to each protruding body 811.

If the light emitting component 2 is lit, light is passed upwardly through the first elastic layer 5 and projected onto the bottom of the light guide plate 1, and the light is focused, refracted and passed from the light guide plate 1 through the second elastic layer 6 and an adhesive layer 7 to the corresponding position of the push button 81, so that the surface of the push button 81 produces a light transmission effect to show a number or a figure on the surface of the push button 81.

Figure 8:
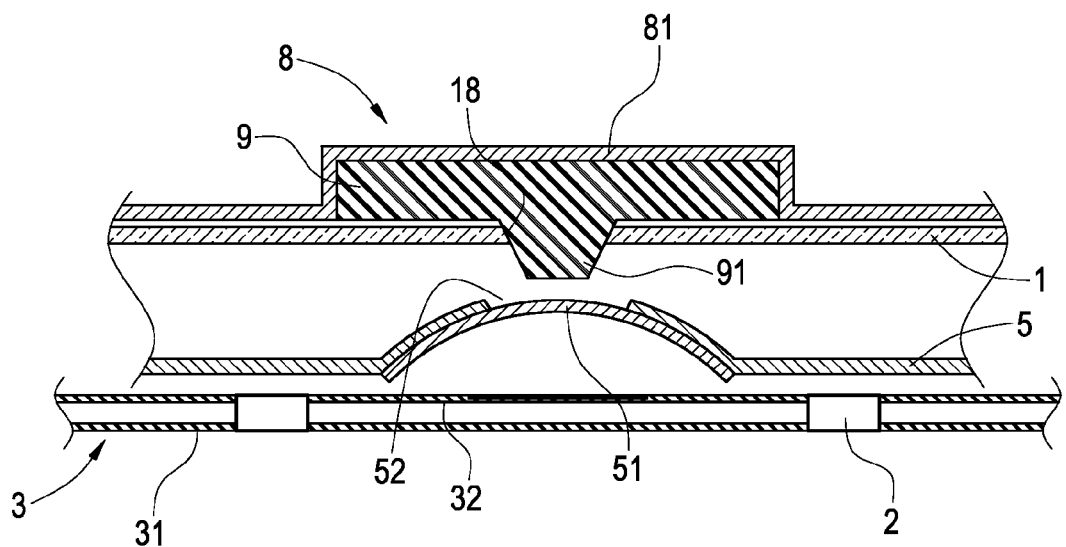
FIG. 8 is a cross-sectional view of a second kind of derived structure of the present invention.

Referring to FIG. 8 for a cross-sectional view of a second kind of derived structure of the present invention, the keypad comprises the following elements:

A thin film circuit board 3 is comprised of two soft plastic thin films 31, and the plastic thin film 31 is printed with an electric circuit 32, and a plurality of light emitting components 2 are installed between the two plastic thin films 31, and the light emitting component 2 is electrically connected to the electric circuit 32, and the electrically conducting power source of the light emitting component 2 is transmitted by the electric circuit 32 of the plastic thin film 31. After the push button is pressed on the thin film circuit board 3 for its operation, the electric circuit 31 outputs an operating signal. In the figure, the corresponding positions of the light emitting component 2 and light guide plate 1 are the same as those illustrated in FIG. 4 or FIG. 6.

A first elastic layer 5 is made of a transparent plastic material and installed on the thin film circuit board 3, and the first elastic layer 5 has a plurality of apertures 52 and a metal plate 51 disposed on another side of the aperture 52. After the push button 81 is pressed by an external force, the metal plate 51 is electrically coupled with the circuit board of the electronic device (not shown in the figure), and the metal plate 51 produces a snap-in sound at the same time, so that users can feel the effect of pressing the push button.

A light guide plate 1 is disposed on the first elastic layer 5, and the structure of the light guide plate 1 is the same as that illustrated in FIG. 4 or FIG. 6, and thus the structure of the light guide plate 1 will not be described further here. The structure of the light guide plate 1 has a plurality of through holes 18.

A push button module 8 is disposed on the light guide plate 1 and comprised of a plurality of push buttons 81, and the interior of each push button 81 installs a second elastic layer 9 made of a transparent rubber material, and the bottom of the second elastic layer 9 has a protruding body 91, and the protruding body 91 is passed through the through hole 18 of the light guide plate 1.

If the light emitting component 2 is lit, the light is passed upwardly through the first elastic layer 5 and projected onto the bottom of the light guide plate 1, and the light is focused, refracted and passed from the light guide plate 1 through the second elastic layer 9 to the corresponding position of the push button 81, such that the surface of the push button 81 produces a light transmission effect to show a number or a figure on the surface of the push button 81.

Figure 9:
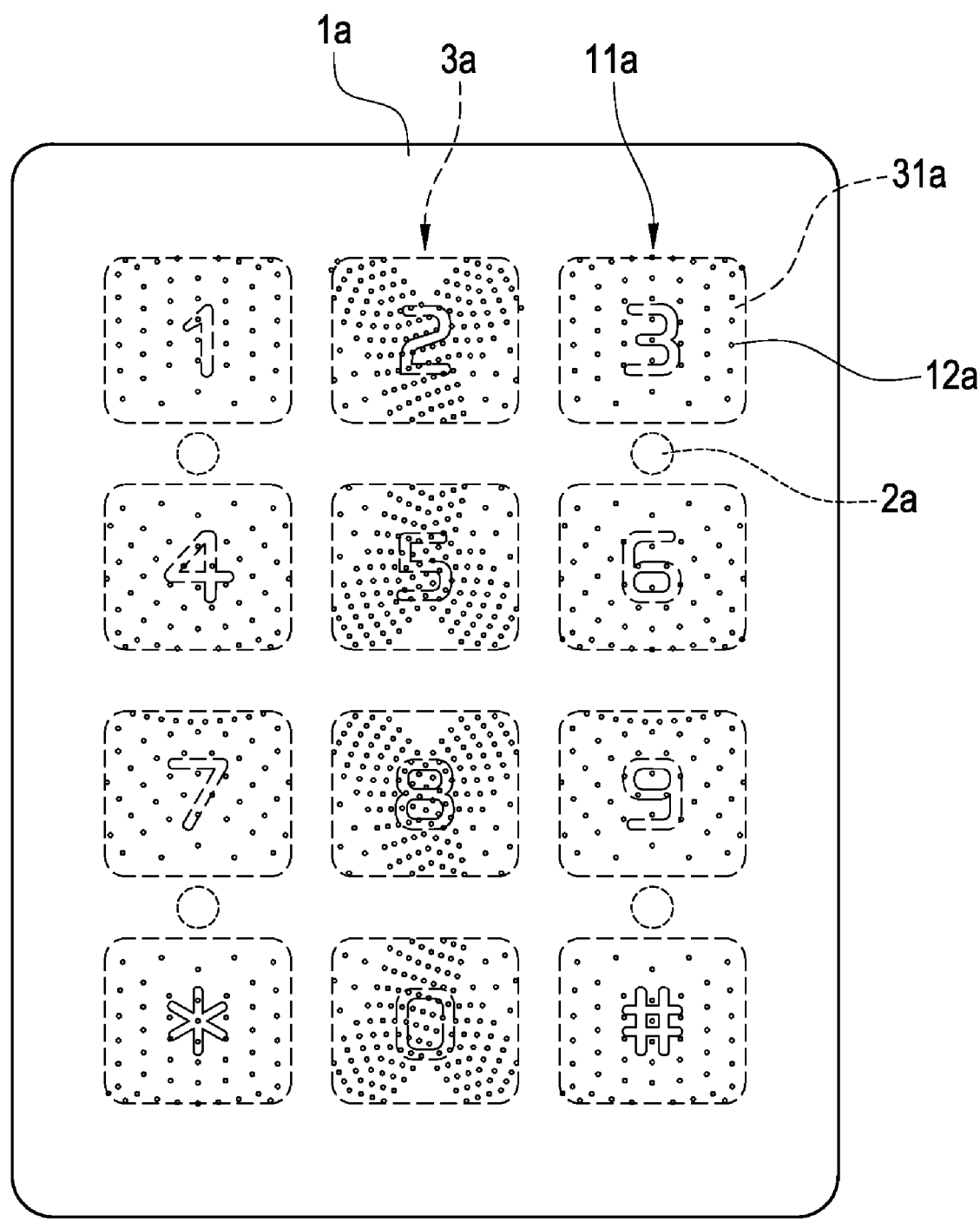
FIG. 9 is a schematic view of another preferred embodiment of the present invention.
Figure 10:
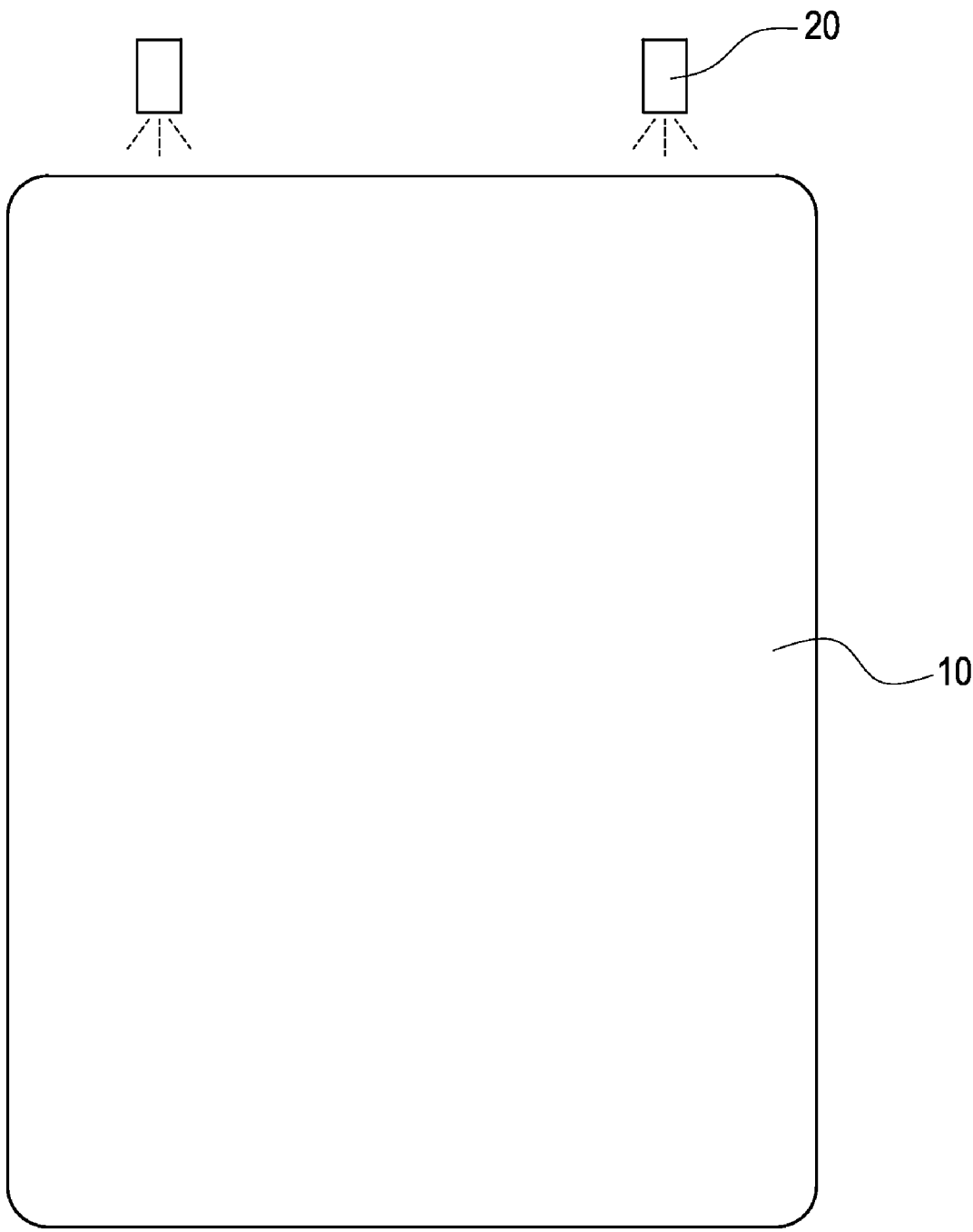
FIG. 10 is a schematic view of a light guide structure of a prior art.

Referring to FIG. 9 for a schematic view of another preferred embodiment of the present invention, the light guide plate 1a has a plurality of light guiding blocks 11a, and each light guiding block 11a has a plurality of arc light guiding particles 12a, and the distribution density of the light guiding particles 12a falls within a range of 1 dot/mm$^2$~20 dots/mm$^2$, wherein the distribution density of the light guiding particles is distributed more scatterly if the distance is closer to the light source, and the distribution density of the light guiding particles is distributed more densely if the distance is farther from the light source.

The light guide plate 1a further installs a plurality of light emitting components 2a disposed perpendicular to the bottom of the light guide plate 1a, and the push button 31a of the keypad 3a is installed at the light guide plate 1a, and the push button 31a is installed at a position corresponding to the light guiding block 11a.

If a plurality of light emitting components 2a are lit, light will be projected onto the light guide plate 1a, the light will be passed through the light guiding particles 12a and refracted to the corresponding position of the push button 31a, such that the surface of the push button 31a has a light transmission effect to show a number or a figure on the push button 31a.

The present invention are illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A light guide structure, installed inside a keypad, comprising:

a light guide plate, having a plurality of light guiding areas, and each light guiding areas has a center light guiding circle, and the external periphery of the center light guiding circle has at least one light guide ring, and each light guiding area and its adjacent light guiding area form at least one light guide ring connected with an intersection, and the center light guiding circle and the light guide ring have a plurality of light guiding particles; and a plurality of light emitting components, installed at a center position corresponding to the center light guiding circle, wherein the light guiding particles are in an arc shape, and the diameter of the light guiding particles falls within a range of 0.01 mm~0.1 mm.

2. The light guide structure of claim 1, wherein the distribution density of the light guiding particles of the center light guiding circle is scatterly distributed, and the distribution density is equal to 1 dot/mm$^2$.

3. The light guide structure of claim 1, wherein the distribution densities of the light guiding particles are evenly and then densely distributed in sequence, and the evenly distributed density is 10 dots/mm$^2$, and the densely distributed density is 20 dots/mm$^2$.

4. The light guide structure of claim 1, wherein the light emitting component is a light emitting diode.

5. The light guide structure of claim 1, wherein the light emitting component is packaged in a thin film circuit board that is comprised of two soft plastic thin films, and an electric circuit is printed on one of the plastic thin films, and the light emitting component is electrically connected with the electric circuit.

6. A keypad having a light guide structure, comprising:

a thin film circuit board, having an electric circuit and a light emitting component disposed thereon, and the light emitting component is electrically connected with the electric circuit;

a first elastic layer, disposed on the thin film circuit board, and having a plurality of metal plates;

a light guide plate, disposed on the first elastic layer, and having a plurality of light guiding areas, and the light guiding area has a center light guiding circle, and the external periphery of the center light guiding circle has at least one light guide ring, and each light guiding area and its adjacent light guiding area form at least one light guide ring connected with an intersection; and the center light guiding circle and the light guide ring have a plurality of light guiding particles;

a second elastic layer, disposed on the light guide plate, and comprised of a rubber body and a hard plastic thin film disposed on the surface of the rubber body, and the bottom of the rubber body has a protruding body corresponding to the metal plate; and a push button module, installed on the second elastic layer, and comprising a plurality of push buttons, and each push button corresponds to each protruding body.

7. The keypad having a light guide structure of claim 6, wherein the thin film circuit board is comprised of two soft plastic thin films.

8. The keypad having a light guide structure of claim 6, wherein the light emitting component is a light emitting diode.

9. The keypad having a light guide structure of claim 6, wherein the first elastic layer is made of a transparent plastic material.

10. The keypad having a light guide structure of claim 6, wherein the light guiding particles are in an arc shape, and the diameter of the light guiding particles falls within a range of 0.01 mm~0.1 mm.

11. The keypad having a light guide structure of claim 6, wherein the distribution density of the light guiding particles of the center light guiding circle is scatterly distributed, and the distribution density is equal to 1 dot/mm$^2$.

12. The keypad having a light guide structure of claim 6, wherein the distribution densities of the light guiding particles of the light guide ring are evenly distributed and then densely distributed in sequence, and the evenly distributed density is equal to 10 dots/mm$^2$, and the densely distributed is equal to 20 dots/mm$^2$.

13. The keypad having a light guide structure of claim 6, further comprising an adhesive layer disposed between first and second elastic layers and the push button module.

14. A keypad having a light guide structure, comprising:
a thin film circuit board, having an electric circuit and a light emitting component disposed thereon, and the light emitting component is electrically connected with the electric circuit;
a first elastic layer, disposed on the thin film circuit board, and having a plurality of apertures, and a metal plate is installed on another side of the apertures;
a light guide plate, disposed on the first elastic layer, and having a plurality of light guiding areas, and the light guiding area has a center light guiding circle, and the external periphery of the center light guiding circle has at least one light guide ring, and each light guiding area and its adjacent light guiding area form at least one light guide ring connected with an intersection, and the center light guiding circle and the light guide ring have a plurality of light guiding particles, and the light guide plate has a plurality of through holes;
a push button module, disposed on the light guide plate, and comprised of a plurality of push buttons, and each push button installs a second elastic layer therein, and the bottom of the second elastic layer has a protruding body, and the protruding body passes through the through hole of the light guide plate.

15. The keypad having a light guide structure of claim 14, wherein the thin film circuit board is comprised of two soft plastic thin films.

16. The keypad having a light guide structure of claim 14, wherein the light emitting component is a light emitting diode.

17. The keypad having a light guide structure of claim 14, wherein the first elastic layer is made of a transparent plastic material.

18. The keypad having a light guide structure of claim 14, wherein the light guiding particles are in an arc shape, and the diameter of the light guiding particles falls within a range of 0.01 mm~0.1 mm.

19. The keypad having a light guide structure of claim 14, wherein the distribution density of the light guiding particles of the center light guiding circle is scatterly distributed, and the distribution density is equal to 1 dot/mm$^2$.

20. The keypad having a light guide structure of claim 14, wherein the distribution densities of the light guiding particles of the light guide ring are evenly distributed and then densely distributed in sequence, and the evenly distributed density is equal to 10 dots/mm$^2$, and the densely distributed density is equal to 20 dots/mm$^2$.

21. The keypad having a light guide structure of claim 14, wherein the second elastic layer is made of a transparent rubber material.

22. A light guide structure, installed inside a keypad, comprising:
a light guide plate, having a plurality of light guiding blocks corresponding to the push buttons of the keypad, and the light guiding block has a plurality of light guiding particles; and
a plurality of light emitting components, disposed under the light guide plate and perpendicular to the light guide plate,
wherein the distribution density of the light guiding particles is more scatterly distributed if the distance from a light source is closer, and the distribution density of the light guiding particles is more densely distributed if the distance from the light source is farther, and the light guiding particles are in an arc shape, and the diameter of the light guiding particles falls within a range of 0.01 mm~0.1 mm and the distribution density falls within a range from 1 dot/mm$^2$ to 20 dots/mm$^2$.

* * * * *